US010787142B2

(12) United States Patent
Mikazuki et al.

(10) Patent No.: US 10,787,142 B2
(45) Date of Patent: Sep. 29, 2020

(54) SUPPORTING STRUCTURE FOR UNDERRUN PROTECTOR

(71) Applicant: NIPPON STEEL & SUMITOMO METAL CORPORATION, Tokyo (JP)

(72) Inventors: Yutaka Mikazuki, Tokyo (JP); Eiji Isogai, Tokyo (JP); Masahiro Nakata, Tokyo (JP); Kenji Yamamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 57 days.

(21) Appl. No.: 16/327,089

(22) PCT Filed: Aug. 24, 2017

(86) PCT No.: PCT/JP2017/030346
§ 371 (c)(1),
(2) Date: Feb. 21, 2019

(87) PCT Pub. No.: WO2018/038210
PCT Pub. Date: Mar. 1, 2018

(65) Prior Publication Data
US 2019/0184924 A1 Jun. 20, 2019

(30) Foreign Application Priority Data
Aug. 26, 2016 (JP) .................................. 2016-165626

(51) Int. Cl.
*B60R 19/56* (2006.01)
(52) U.S. Cl.
CPC .................................. *B60R 19/56* (2013.01)
(58) Field of Classification Search
CPC ............ B60R 19/56; B60R 2021/0083; B60R 2021/0004; B62D 25/08; B60Y 2200/142; B60Y 2200/11
(Continued)

(56) References Cited

U.S. PATENT DOCUMENTS 7,900,983 B2 * 3/2011 Saitou ..................... B60R 19/56
293/102
9,199,594 B2 * 12/2015 Musale .................. B60R 19/56
(Continued)

FOREIGN PATENT DOCUMENTS

JP  2004-243984 A  9/2004
JP  2006-88905 A   4/2006
(Continued)

OTHER PUBLICATIONS

International Search Report for PCT/JP2017/030346 dated Oct. 10, 2017.
(Continued)

*Primary Examiner* — Pinel E Romain
(74) *Attorney, Agent, or Firm* — Birch, Stewart, Kolasch & Birch, LLP

(57) ABSTRACT

This supporting structure for an underrun protector includes a stay body that connects a beam and a frame to each other; a stay reinforcing body that reinforces the stay body from an outside in a vehicle width direction; and a gusset provided between the stay reinforcing body and the beam. A stay body web face of the stay body is provided with an opening part. A pair of wall face parts provided to extend outward in the vehicle width direction from both ends of the opening part in a vehicle forward-rearward direction is provided so as to face each other. Each of the wall face parts is provided at a height corresponding to an installation position of the gusset and abuts against an inner surface of the stay reinforcing body in the vehicle width direction.

8 Claims, 8 Drawing Sheets

(58) Field of Classification Search
USPC .......................................................... 296/155
See application file for complete search history.

(56) References Cited

U.S. PATENT DOCUMENTS

| | | | |
|---|---|---|---|
| 9,308,881 B2* | 4/2016 | Bobba | ..................... B60R 19/56 |
| 10,118,580 B2* | 11/2018 | Kurihara | ................. B60R 19/56 |
| 2009/0001682 A1 | 1/2009 | Yamashita et al. | |
| 2013/0249223 A1* | 9/2013 | Deighton | ................ B60R 19/56 |
| | | | 293/103 |
| 2018/0265025 A1 | 9/2018 | Mikazuki et al. | |

FOREIGN PATENT DOCUMENTS

| | | |
|---|---|---|
| JP | 2010-120512 A | 6/2010 |
| JP | 2010-132059 A | 6/2010 |
| JP | 2010-269663 A | 12/2010 |
| JP | 2015-44572 A | 3/2015 |
| WO | WO 2007/083414 A1 | 7/2007 |
| WO | WO 2014/125400 A2 | 8/2014 |
| WO | WO 2016/125745 A1 | 8/2016 |

OTHER PUBLICATIONS

Written Opinion of the International Searching Authority for PCT/JP2017/030346 (PCT/ISA/237) dated Oct. 10, 2017.

* cited by examiner

SUPPORTING STRUCTURE FOR UNDERRUN PROTECTOR

TECHNICAL FIELD OF THE INVENTION

The present invention relates to a supporting structure for an underrun protector that prevents one vehicle from slipping under the other vehicle at the time of collision of vehicles, such as automobiles.

Priority is claimed on Japanese Patent Application No. 2016-165626, filed Aug. 26, 2016, the content of which is incorporated herein by reference.

RELATED ART

For example, in a case where a passenger car, and a large-sized vehicle, such as a truck, make a head-on collision or make a rear-end collision, there is a concern that the passenger car may slip under the large-sized vehicle, due to a difference between the installation heights of strengthening members, such as cross members provided in the mutual vehicles. For this reason, strengthening members referred to as underrun protectors disposed in conformity with the installation heights of strengthening members provided in the passenger car are respectively provided at a front part and a rear part of the large-sized vehicle. This prevents slipping of the passenger car at the time of a collision.

As the related-art underrun protectors, there are those described in Patent Documents 1 to 3. These underrun protectors have a structure in which a beam extending in a vehicle width direction is bolt-fastened to a vehicle body frame via a bracket or stay (supporting structure).

The underrun protectors are required to have sufficient load bearing performance. As one method of evaluating the load bearing performance, there is a method of applying a load to a collision surface (a surface against which a mating vehicle collides) of the beam at a position outside the stay attachment position of the beam in the vehicle width direction and evaluating how much load can be input at maximum. Since the performance of the underrun protectors as products is influenced by the superiority or inferiority of the load bearing performance, development of such underrun protectors such that a maximum input load in a load bearing performance evaluation test is still larger than before has been desired. Moreover, lightweight underrun protectors have also been desired.

At the time of the load input, a structure that resists a bending moment having a vehicle upward-downward direction as an axis is desired for the beam, and a structure that resists a torsional moment having the vehicle upward-downward direction is desired for the stay.

Patent Document 1 discloses a structure that protects a side frame from a shock load at the time of a slight collision by virtue of a stay and frame fixing structure including "a first member having a web face that is fixed to a frame web face and vertically orientated, and a first flange surface that provided to extend outward in a vehicle width direction from one end of the web face in a vehicle forward-rearward direction and fixed to an underrun protector", and "a second member having an upper surface fixed to a horizontally orientated frame flange surface and the web face, a front surface that provided to extend vertically downward from one end of the upper surface in the vehicle forward-rearward direction and fixed to the underrun protector, and a side surface that is formed to be bent in a vehicle forward-rearward direction from an outer end portion of the front surface in the vehicle width direction and is fixed to the web face of the first member".

Patent Document 2 discloses a structure in which a stay is constituted of "a stay body that couples a vehicle body frame and a beam to each other", and "a stay reinforcing body that reinforces the stay body", and "a gusset that reinforces a connecting part between the stay and the beam", and resistance against the bending deformation of the beam is increased by the gusset bridged between the beam and the stay. Additionally, Patent Document 2 also discloses a structure in which the resistance against the torsional deformation of the stay is increased by a stay structure in which a recessed part is formed in the stay body by providing bent parts at both ends of the stay body in a lateral direction, and the stay reinforcing body is fitted into the recessed part so as to form a closed section shape.

Patent Document 3 discloses a structure in which an action, which hinders inward deformation of a stay resulting from a load transmitted via a beam when the load is input to the beam is caused by a structure having a connection structure that connects the beam to a vehicle body frame, a stay formed so as to extend in a vertical direction, a L-shaped bracket provided between the beam and the stay, a reinforcing material, and a reinforcing plate.

PRIOR ART DOCUMENT

Patent Document

[Patent Document 1] Japanese Unexamined Patent Application, First Publication No. 2010-132059

[Patent Document 2] Japanese Unexamined Patent Application, First Publication No. 2010-120512

[Patent Document 3] PCT International Publication No. WO2016/125745

DISCLOSURE OF THE INVENTION

Problems to be Solved by the Invention

However, Patent Document 1 relates to the fixing structure that protects the side frame, and the load bearing performance is not improved only with this technique.

In the supporting structure of Patent Document 2, the out-of-plane deformation of a vertically disposed stay reinforcing part web face of the stay reinforcing part proceeds due to the load input from the gusset and the torsional deformation of the stay. Accordingly, a sufficient improvement in load bearing performance is not obtained.

In the connection structure of Patent Document 3, in a case where opening parts are provided on either or both sides of the bracket or the stay the vehicle forward-rearward directions from the inside of the reinforcing plate in the vehicle width direction, the load bearing performance degrades. That is, in a case where the opening parts are provided in either or both of the bracket in the vehicle forward-rearward direction, the rigidity of the bracket becomes low due to the formation of the opening parts. Thus, the load input from the bracket is not transmitted to the entire surface of the bracket on the vehicle body frame side. Therefore, the load bearing performance degrades. Additionally, in a case where the opening parts are provided on either or both sides of the stay in the vehicle forward-rearward directions, the area for receiving the input from the reinforcing material decreases. Thus, the load bearing performance degrades.

The invention has been made in view of the problems of the related art, and provides a supporting structure for an underrun protector that is capable of suppressing deformation against a torsional moment input to a stay and is lightweight and excellent in load bearing performance, even if a load is applied a position outside the stay attachment position of a beam in a vehicle width direction.

Means for Solving the Problem

The present inventors have completed the invention with the following knowledge as a result of having earnestly studied an occurrence situation of torsional deformation of a stay in a case where a load is applied to a collision surface (a surface against which a mating vehicle collides) of a beam, at a position outside the stay attachment position of the beam in a vehicle width direction, with respect to a supporting structure for an underrun protector including a stay body that connects the beam and a frame to each other, and a stay reinforcing body that reinforces a stay body, and a gusset provided between the stay reinforcing body and the beam. That is, the above problem can be solved by providing a stay body web face orientated parallel to a vehicle upward-downward direction of the stay body with an opening part, providing a pair of wall face parts provided to extend outward in the vehicle width direction from both ends of the opening part so as to face each other, and making the wall face parts abut against the stay reinforcing body at the height position of at least one gusset in the vehicle upward-downward direction.

The concept of the invention is as follows.

(1) A supporting structure for an underrun protector includes a stay body that connects a beam and a frame to each other; a stay reinforcing body that reinforces the stay body from an outside in a vehicle width direction; and a gusset provided between the stay reinforcing body and the beam, a stay body web face of the stay body is provided with an opening part, a pair of wall face parts provided to extend outward in the vehicle width direction from both ends of the opening part in a vehicle forward-rearward direction are provided so as to face each other, and each of the wall face parts is provided at a height corresponding to an installation position of the gusset and abuts against an inner surface of the stay reinforcing body in the vehicle width direction. Additionally, configurations (2) to (8) as follows may be adopted.

(2) The supporting structure for an underrun protector described in the above (1) in which the opening part has a substantially corner-rounded quadrangular shape constituted of a pair of mutually facing straight side parts and a pair of mutually facing circle parts, and each of the wall face parts provided to extend outward in the vehicle width direction from both sides of each of the straight side parts abuts against the inner surface of the stay reinforcing body in the vehicle width direction.

(3) The supporting structure for an underrun protector described in the above (1) or (2) in which the wall face parts are formed by bending the stay body web face.

(4) The supporting structure for an underrun protector described in the above (2) or (3) in which a relationship among a length L1 of the opening part, an average width W1 of the opening part, a length L0 of the stay body from a flange of a lower face of the frame, an average width W0 of the stay body, and a height h, in the vehicle width direction, of a closed section formed by the stay body and the stay reinforcing body satisfies $0.5 \leq L1/L0 \leq 0.8$ and $2 \times h \leq W1 \leq 0.85 \times W0$.

(5) The supporting structure for an underrun protector described in any one of the above (2) to (4) in which a height h1 of the wall face part provided to extend outward in the vehicle width direction from an outer surface of the circle part in the vehicle width direction is $5\ mm \leq h1 \leq 15\ mm$.

(6) The supporting structure for an underrun protector described in any one of the above (1) to (5) in which upper and lower face parts of the stay reinforcing body provided to extend inward in the vehicle width direction from both ends of the stay reinforcing body in a vehicle upward-downward direction are provided, and the upper and lower face parts abut against the stay body.

(7) The supporting structure for an underrun protector described in any one of the above (1) to (6) in which the frame has a vertically orientated frame web face, and a flange of a lower face of the frame provided to extend outward in the vehicle width direction from a lower end of the frame web face, and the stay body is fixed by the frame web face and the flange.

(8) The supporting structure for an underrun protector described in any one of the above (1) to (7) in which the stay body and the stay reinforcing body are made of a steel sheet having a strength of 780 MPa class or more.

Effects of the Invention

According to the invention, it is possible to provide the supporting structure for an underrun protector that is capable of suppressing deformation against a torsional moment input to a stay and is lightweight and excellent in load bearing performance, even if a load is applied at a position outside the stay attachment position of a beam in a vehicle width direction.

EMBODIMENTS OF THE INVENTION

Figure 1:
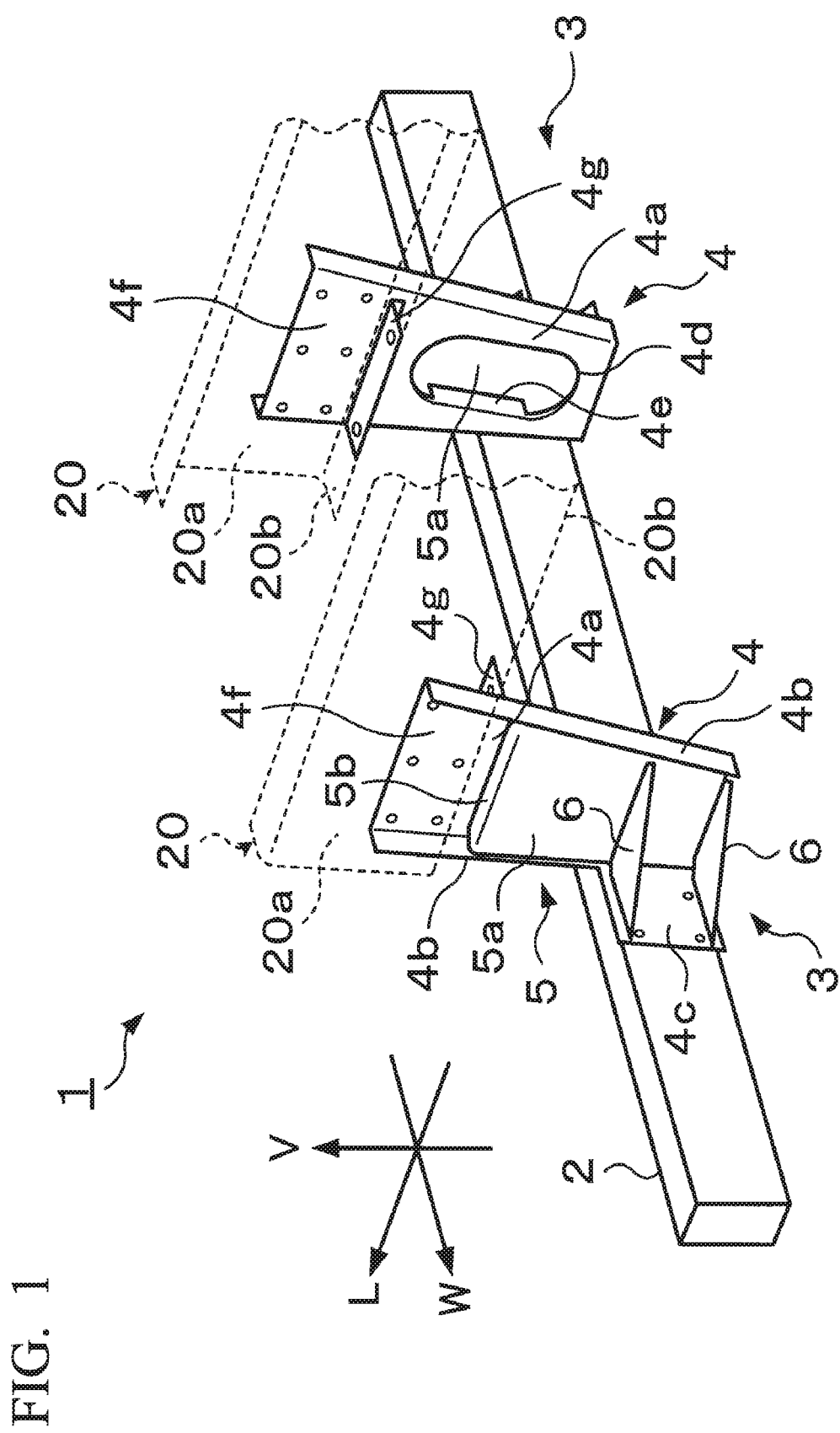
FIG. 1 is a perspective view showing an underrun protector related to an embodiment of the invention.

Hereinafter, a supporting structure for an underrun protector related to an embodiment of the invention will be described, referring to the drawings. In addition, in the present specification and drawings, elements having substantially the same functional configurations will be designated by the same reference signs and thereby, duplication description will be omitted.

As shown in FIG. 1, an underrun protector 1 of the embodiment of the invention is constituted of a beam 2 extending in a vehicle width direction W, and a supporting structure 3 of an underrun protector for connecting the beam 2 and a frame 20 to each other.

The supporting structure 3 of the underrun protector is constituted of a stay body 4 that connects the beam 2 and the frame 20 to each other, a stay reinforcing body 5, and a gusset 6.

The stay body 4 has a vertically orientated stay body web face 4a, and stay body forward-rearward face parts 4b extending outward in the vehicle width direction W from end portions of the stay body web face 4a in a vehicle forward-rearward direction L, and has a substantial U-shape. The stay body 4 is connected to the frame 20 at a frame web face attachment part 4f and a frame lower face attachment part 4g, and is connected to the beam 2 at a beam attachment part 4c. Bolt fastening is used for the connection between the stay body 4 and the beam 2 or the frame 20.

As shown in FIGS. 2 to 5, the stay reinforcing body 5 has a vertically orientated stay reinforcing body web face 5a, and a stay reinforcing body upper and lower face parts 5b extended inward in the vehicle width direction W from end portions the stay reinforcing body web face 5a in the vehicle upward-downward direction V, and has a substantial U-shape. The stay reinforcing body 5 is disposed so as to cover an opening of the stay body 4 at a portion of the stay body 4 excluding the frame web face attachment part 4f. A closed section is formed by the end portions of the stay reinforcing body web face 5a in the vehicle forward-rearward direction L and the stay body forward-rearward face parts 4b being connected to each other and the ends of the stay reinforcing body upper and lower face parts 5b and the stay body web face 4a being connected to each other. Electric arc welding is used for the connection between these. In the present embodiment, by fixing the stay reinforcing body 5 in this way, the stay body 4 is reinforced from the outside in the vehicle width direction W.

The gusset 6 is a substantially triangular plate, and a plurality of (two in the present embodiment) the gussets 6 are disposed side by side in the vehicle upward-downward direction V so as to bridge over the outer surfaces of the beam attachment part 4c and the stay reinforcing body web face 5a in the vehicle width direction W.

Figure 2:
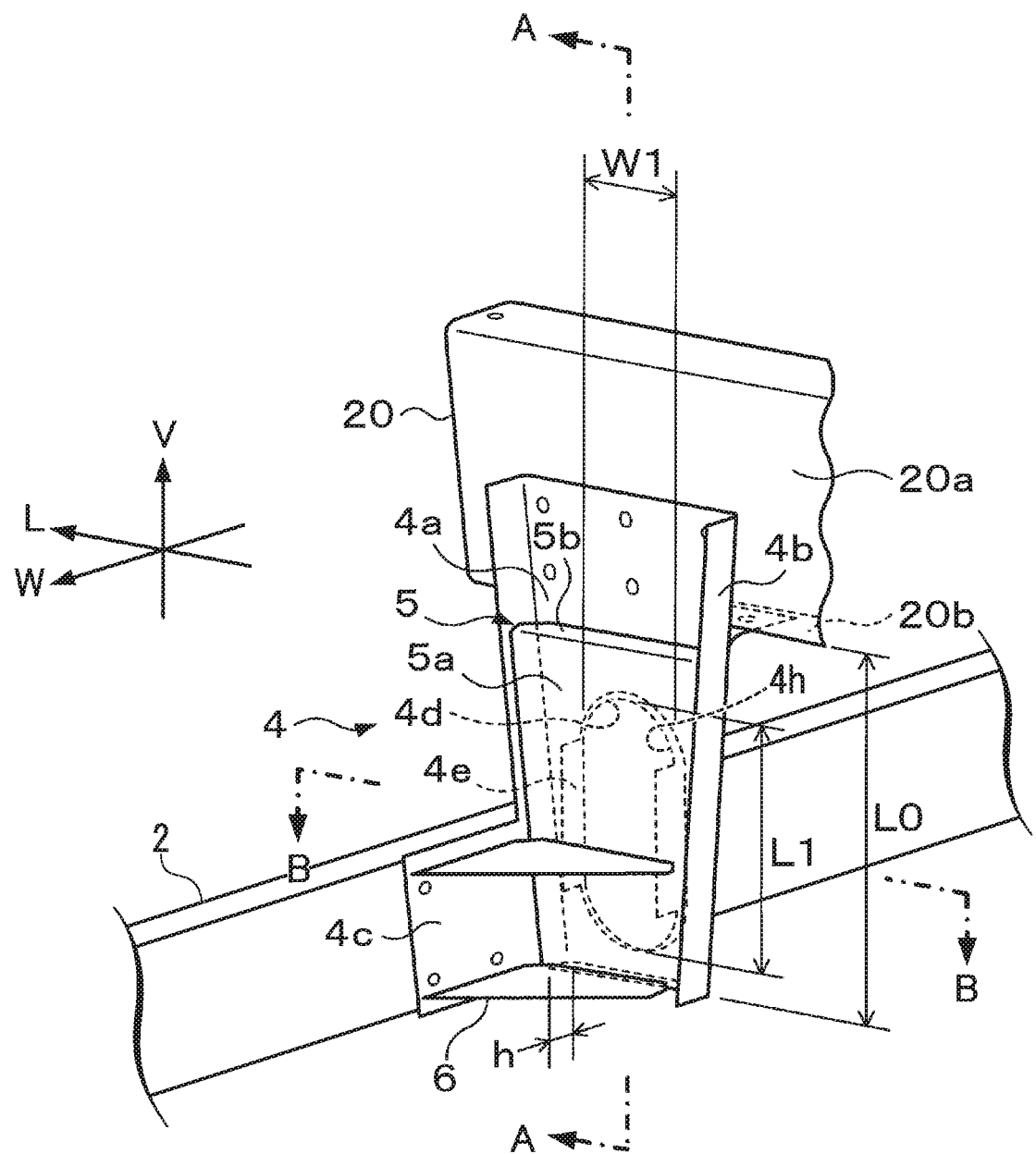
FIG. 2 is an enlarged perspective view of a supporting structure for the underrun protector on the left side of FIG. 1.
Figure 3:
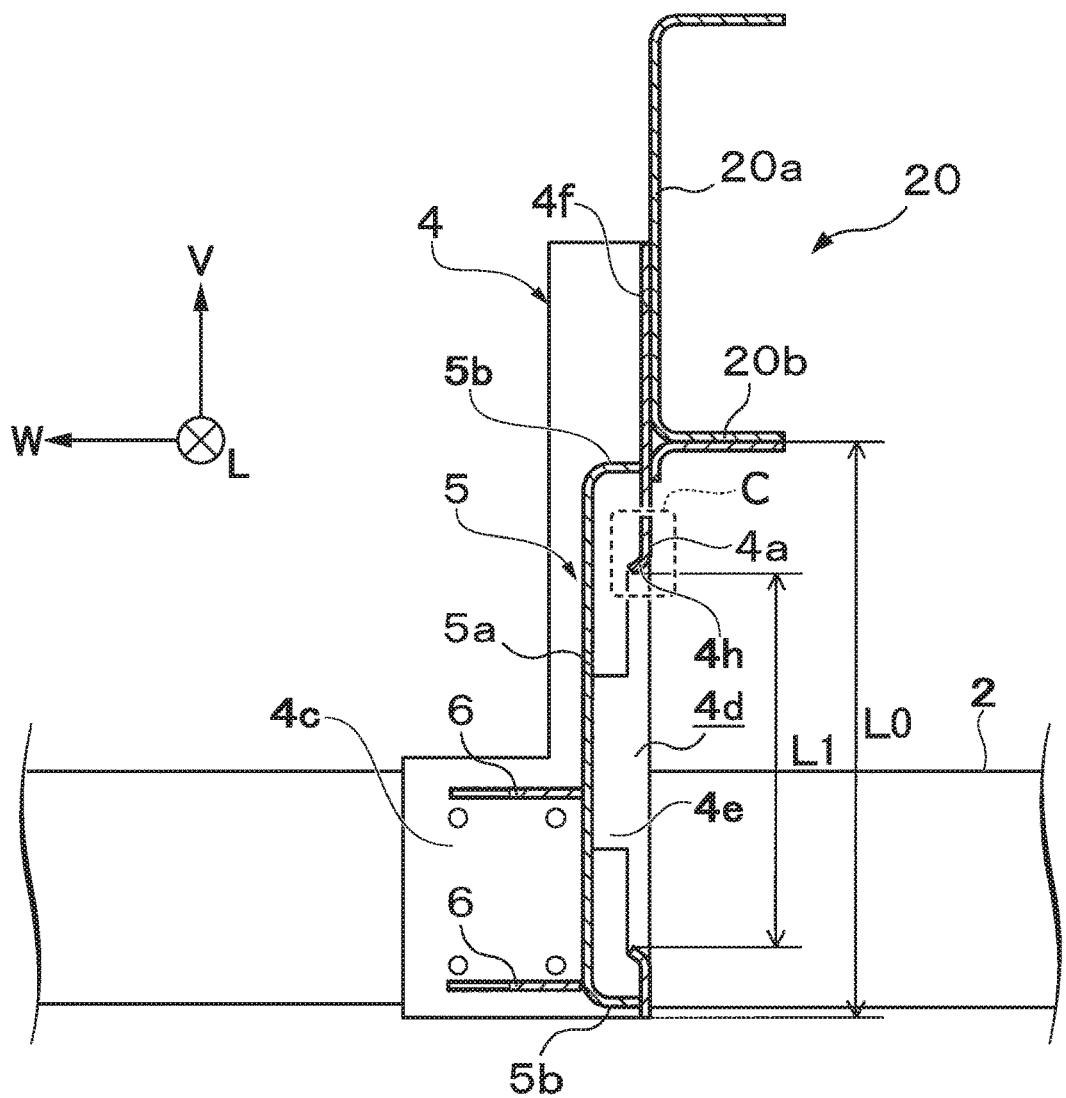
FIG. 3 is a sectional view taken along line A-A of FIG. 2.

As shown in FIGS. 2 and 3, in the supporting structure 3 of the underrun protector related to the embodiment of the invention, the stay body web face 4a is provided with a opening part 4d having a substantially corner-rounded quadrangular shape, and wall face parts 4e is provided to extend outward in the vehicle width direction W from both end portions of the opening part 4d in the vehicle forward-rearward direction L. The wall face parts 4e are provided so as face each other. The wall face parts 4e provided to extend from mutually facing straight side parts of the opening part 4d having the substantially corner-rounded quadrangular shape abut against the stay reinforcing body 5, and supports the upper-stage gusset 6 via the web face 5a of the stay reinforcing body 5. Electric arc welding is used for the connection between the wall face parts 4e and the stay reinforcing body 5. In addition, the expression "substantially corner-rounded quadrangular shape" is a substantially quadrangular shape constituted of the mutually facing straight side parts, and circle parts that connect terminal points of the respective straight side parts to each other and has an arbitrary curvature radius.

Figure 6:
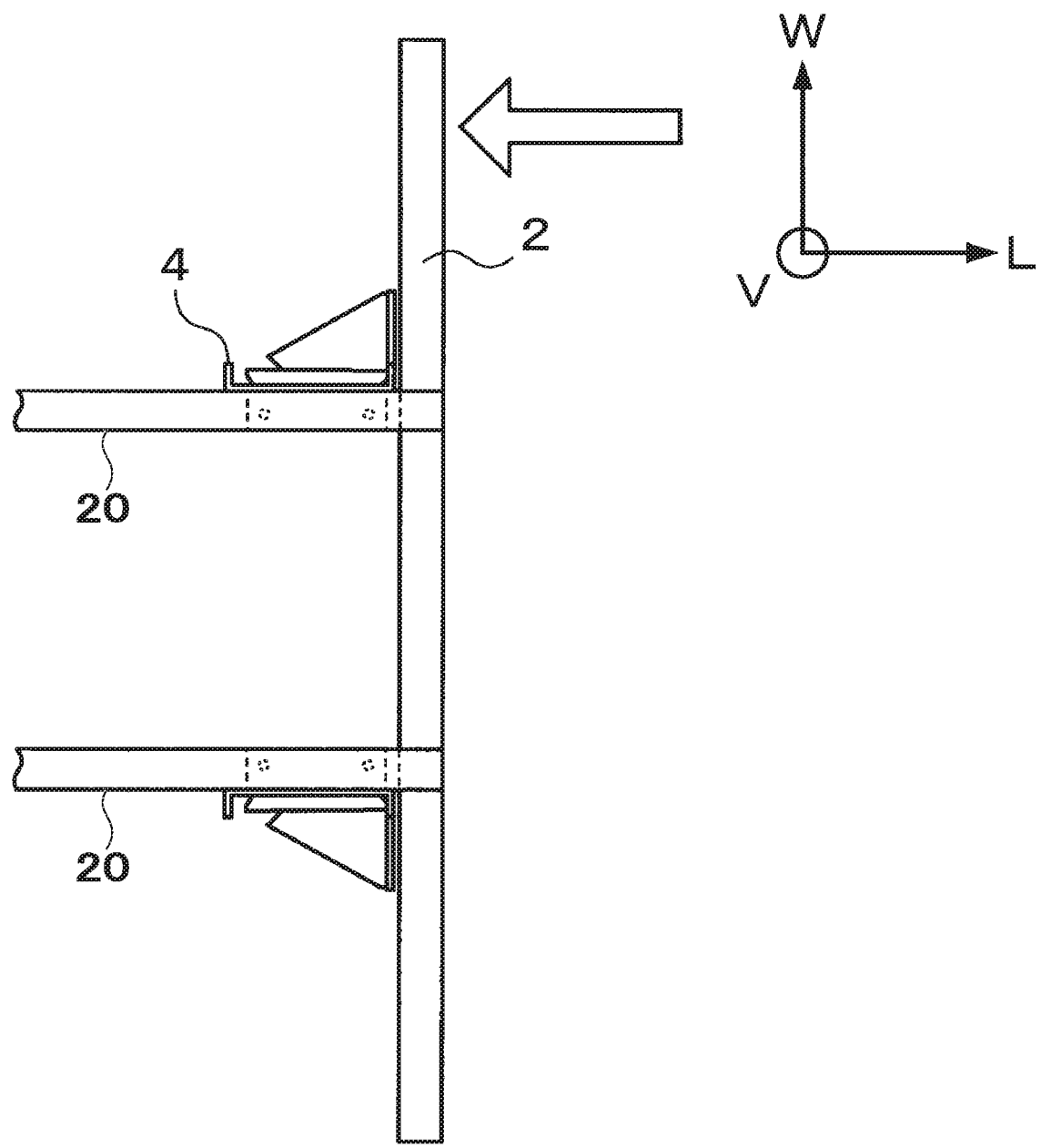
FIG. 6 is a plan view showing the conditions of load input to the underrun protector.

The supporting structure 3 of the underrun protector related to the embodiment of the invention is configured as described above. In a case where a load bearing test is performed using the underrun protector 1 having the supporting structure 3 of the underrun protector, for example, as shown in FIG. 6, an indenter is applied to a collision surface of the beam 2 and inputs a load at a position (a position indicated by an arrow in FIG. 6) outside the stay attachment position of the beam 2 in the vehicle width direction.

In this case, according to the supporting structure 3 of the underrun protector of the present embodiment, as shown in examples to be described below, the wall face parts 4e connected to the stay reinforcing body 5 support the stay reinforcing body web face 5a at a height corresponding to the installation position of the gusset 6. Therefore, buckling of the stay reinforcing body 5 is suppressed by virtue of a reduction in the out-of-plane deformation of the web face 5a of the stay reinforcing body 5 against the input of a load from the gusset 6, or a reduction in the out-of-plane deformation of the web face 5a of the stay reinforcing body 5 caused by torsional deformation of the stay body 4 and the stay reinforcing body 5. Here, the expression "height corresponding to the installation position of the gusset 6" is a height where the wall face parts 4e connected to the stay reinforcing body 5 overlap the installation position of the gusset 6 in the vehicle upward-downward direction V.

Accordingly, since the resistance against the torsional moment of the supporting structure 3 of the underrun protector is increased, the load bearing performance of the underrun protector 1 is improved.

Additionally, according to the supporting structure 3 of the underrun protector of the present embodiment, since the opening part 4d is provided, weight reduction can also be achieved.

While the preferred embodiment of the invention has been described above, it should be understood that the invention is not limited to such an embodiment only. Those skilled in the art will appreciate that various alterations or modifications can be conceived within the scope of the technical idea set forth in the claims and these also naturally fall within the technical scope of the present invention.

For example, in the supporting structure 3 of the underrun protector of FIG. 1, the straight side parts of the opening part 4d having the substantially corner-rounded quadrangular shape are orientated substantially parallel to the vehicle upward-downward direction V. However, a structure may be adopted in which the straight side parts are orientated substantially parallel to the vehicle forward-rearward direction L, and the wall face parts 4e connected to the stay reinforcing body 5 supports the stay reinforcing body web face 5a at the height corresponding to the installation position of the gusset 6. In addition the expression "height corresponding to the installation position of the gusset 6" is a height where the wall face parts 4e connected to the stay reinforcing body 5 overlap the installation position of the gusset 6 in the vehicle upward-downward direction V. However, from a viewpoint of a reduction in the out-of-plane deformation of the web face 5a of the stay reinforcing body 5 caused by the torsional deformation of the stay body 4 and the stay reinforcing body 5, it is preferable to orientate the straight side parts capable of supporting the stay reinforcing body web face 5a within a wide range in the vehicle upward-downward direction V, substantially parallel to the vehicle upward-downward direction V.

For example, in the supporting structure 3 of the underrun protector of FIG. 1, the stay body forward-rearward face parts 4b and the beam attachment part 4c are integrated with each other. However, the beam attachment part 4c may be provided as a separate body and may be connected to the stay body 4 or the stay reinforcing body 5.

In the supporting structure 3 of the underrun protector of FIG. 1, the stay body web face 4a and the frame web face attachment part 4f are integrated with each other, and the frame lower face attachment part 4g is a separate body. However, the frame web face attachment part 4f may be a separate body, and the frame lower face attachment part 4g may be integrated with the stay body 4 or the stay reinforcing body 5.

Additionally, a structure may be adopted in which the frame lower face attachment part 4g is not provided. Meanwhile, by having the frame lower face attachment part 4g, the load received by the supporting structure 3 of the underrun protector can be transmitted to the frame 20 due to shear deformation, and the load bearing performance is increased. Therefore, the frame lower face attachment part 4g may be appropriately set in accordance with the performance required as the underrun protector 1.

Additionally, a structure may be adopted in which the upper and lower face parts 5b of the stay reinforcing body 5 are not provided. Meanwhile, by providing the upper and lower face parts 5b of the stay reinforcing body 5, the openings of the stay body 4 and the stay reinforcing body 5 in the vehicle upward-downward direction V are eliminated, the resistance against the torsional deformation of the stay body 4 and the stay reinforcing body 5 is enhanced and the load bearing performance is enhanced. Therefore, the upper and lower face parts 5b of the stay reinforcing body 5 may be appropriately set in accordance with the performance required as the underrun protector 1.

In addition, in the above embodiment, the shape of the opening part 4d provided in the stay body web face 4a is a substantially corner-rounded quadrangular shape. However, the shape of the opening part 4d is not particularly limited as long as the stay reinforcing body web face 5a can be supported by the wall face parts 4e.

In this way, if the supporting structure 3 of the underrun protector 1 has a configuration in which the stay body web face 4a is provided with the opening part 4d, the wall face parts 4e extends outward in the vehicle width direction W from both ends of the opening part 4d, and the wall face parts 4e abut against the inner surfaces of the stay reinforcing body 5 in the vehicle width direction W at the height corresponding to the installation position of the gusset 6, it is possible to enjoy the aforementioned effects. In addition, if the wall face parts 4e support the stay reinforcing body 5 at the height corresponding to the installation position of at least one gusset even in a case where a plurality of the gussets 6 are installed, the out-of-plane deformation of the supporting portions against the input of a load from the gussets 6 can be suppressed. In other words, even in a case where the plurality of gussets 6 are installed, even if the wall face parts 4e do not support the stay reinforcing body 5 so as to correspond to the installation heights of all the gussets 6, it is possible to improve the load bearing performance compared to the related-art structure. However, in a case where the plurality of gussets 6 are provided, it is preferable to support the stay reinforcing body 5 with the wall face parts 4e having the length from the gusset 6 at the highest stage to the gusset 6 at the lowest stage as described in the above embodiment. Here, the expression "height corresponding to the installation position of the gusset" is a height where the wall face parts 4e connected to the stay reinforcing body 5 overlap the installation position of the gusset 6 in the vehicle upward-downward direction V.

Additionally, it is preferable that the opening part 4d having the substantially corner-rounded quadrangular shape is formed such that, as shown in FIGS. 2 to 5, a relationship among a stay body opening part length L1 (a length in the vehicle upward-downward direction V), an average width W1 (a length in the vehicle forward-rearward direction L) of the stay body opening part, a length L0 (mm) (a length in the vehicle upward-downward direction V) from a flange of a frame lower face 20b of the stay body 4, an average width W0 (mm) (a length in the vehicle forward-rearward direction L) of the stay body, and a height h (mm), in the vehicle width direction W, of the closed section formed by the stay body 4 and the stay reinforcing body 5 satisfies $0.5 \leq L1/L0 \leq 0.8$ and $2 \times h \leq W1 \leq 0.85 \times W0$. The average width W0 of the stay body is the average of a maximum value and a minimum value of the width (the length in the vehicle forward-rearward direction L) of the stay body. The average width W1 of the stay body opening part is the average of a maximum value and a minimum value of the width (the length in the vehicle forward-rearward direction L) of the stay body opening part. If L1/L0 is less than 0.5, the weight-reducing effect is poor. Conversely, if L1/L0 exceeds 0.8, there is a concern that the effect of improving the load bearing performance become smaller due to a reduction in the area of the stay body web face 4a. If W1 is less than $2 \times h$, the height (the length in the vehicle width direction W) of the wall face parts 4e cannot be made to be equal to larger than h, and the wall face parts 4e cannot be brought into abutment with the stay reinforcing body web face 5a. On the other hand, in a case where W1 exceeds $0.85 \times W0$, the effect of improving the load bearing performance becomes smaller due to a reduction in the area of the stay body web face 4a.

Additionally, it is preferable that the curvature radius R (mm) of each circle part of the substantially corner rounded quadrangular shape is $R=0.5 \times W1$. This is equivalent to a state where the straight side parts and the circle parts are smoothly connected to each other, and it is possible to avoid breakage caused by strain concentration during molding due to discontinuous connection.

Figure 4:
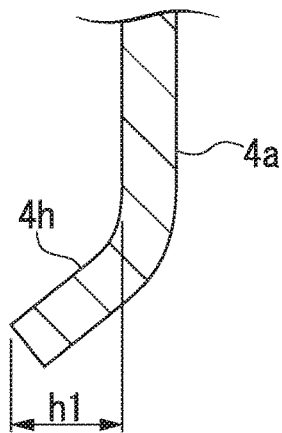
FIG. 4 is an enlarged view of portion C of FIG. 3.
Figure 5:
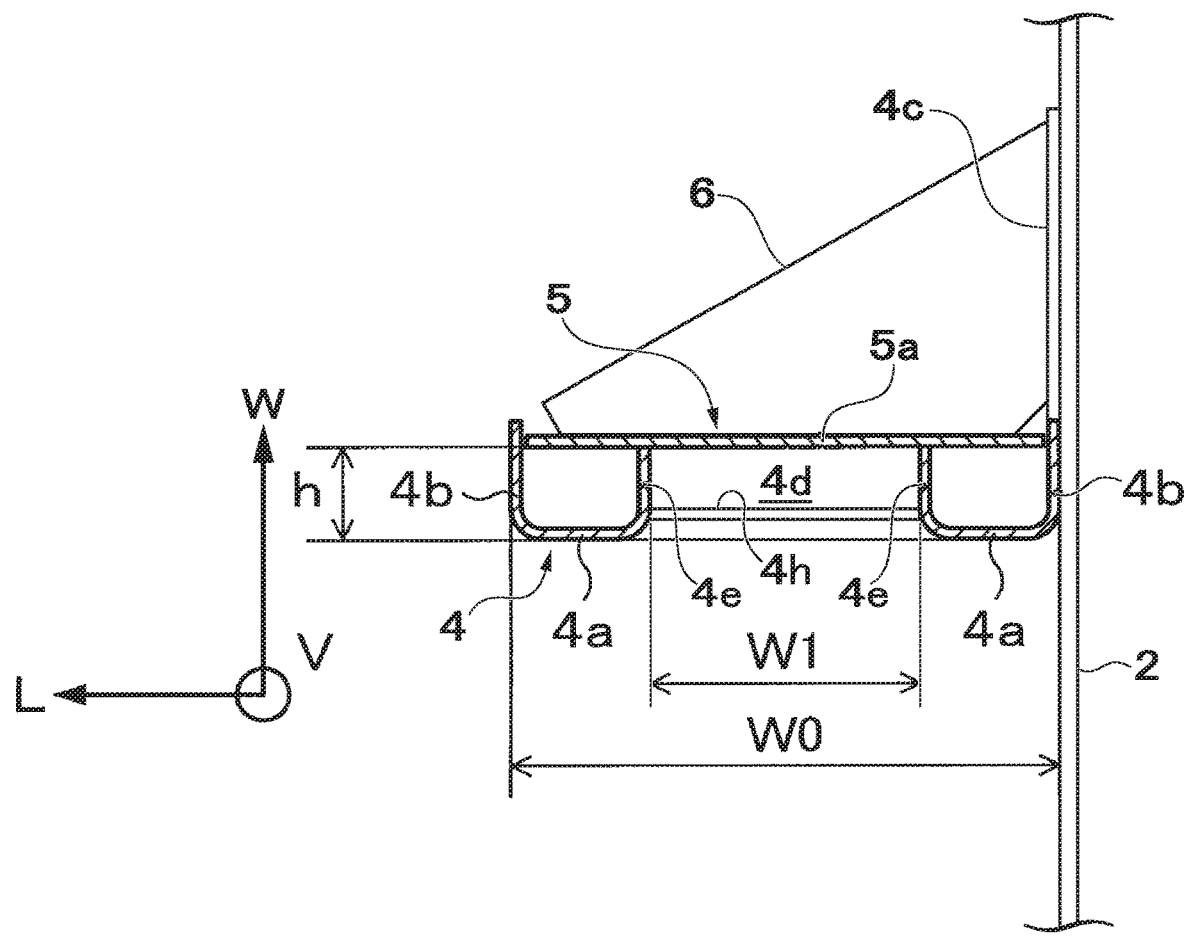
FIG. 5 is a sectional view taken along line B-B of FIG. 2.

Additionally, it is preferable that the height h1 of the wall face part 4h provided to extend outward in the vehicle width direction W from the outer surface, in the vehicle width direction W, of each circle part of the opening part 4d having the substantially corner-rounded quadrangular shape as shown in FIGS. 2 to 4 is $5 \text{ mm} \leq h1 \leq 15 \text{ mm}$. By providing the wall face part 4h of the circle part, this contributes to prevention of the out-of-plane deformation of the stay body 4. Although shown in the examples to be described below, the load bearing performance is enhanced by coupling the wall face parts 4e of the straight side parts of the opening part 4d to each other by the wall face part 4h of the circle part. When the height h1 of the wall face part 4h of the circle part is less than 5 mm, the effect is poor, and when the height h1 of the wall face part 4h of the circle part is equal to or more than 15 mm, an increase in weight is caused compared to the effect. In addition, in a case where a steel sheet of 780 MPa or more is applied, the possibility of breaking an edge during the molding of the wall face part 4h of the circle part is high. It is still more preferable that the height h1 of the wall face part 4h of the circle part is $8 \text{ mm} \leq h1 \leq 12 \text{ mm}$. In this way, the opening part 4d is provided not only for weight reduction, the load bearing performance of the underrun protector supporting structure is enhanced by providing the opening part 4d, further reinforcing the stay body 4 with the wall face part 4h of the circle part of the opening part 4d, and further supporting the stay reinforcing body 5 by the wall face parts 4e.

EXAMPLES

Figure 7:
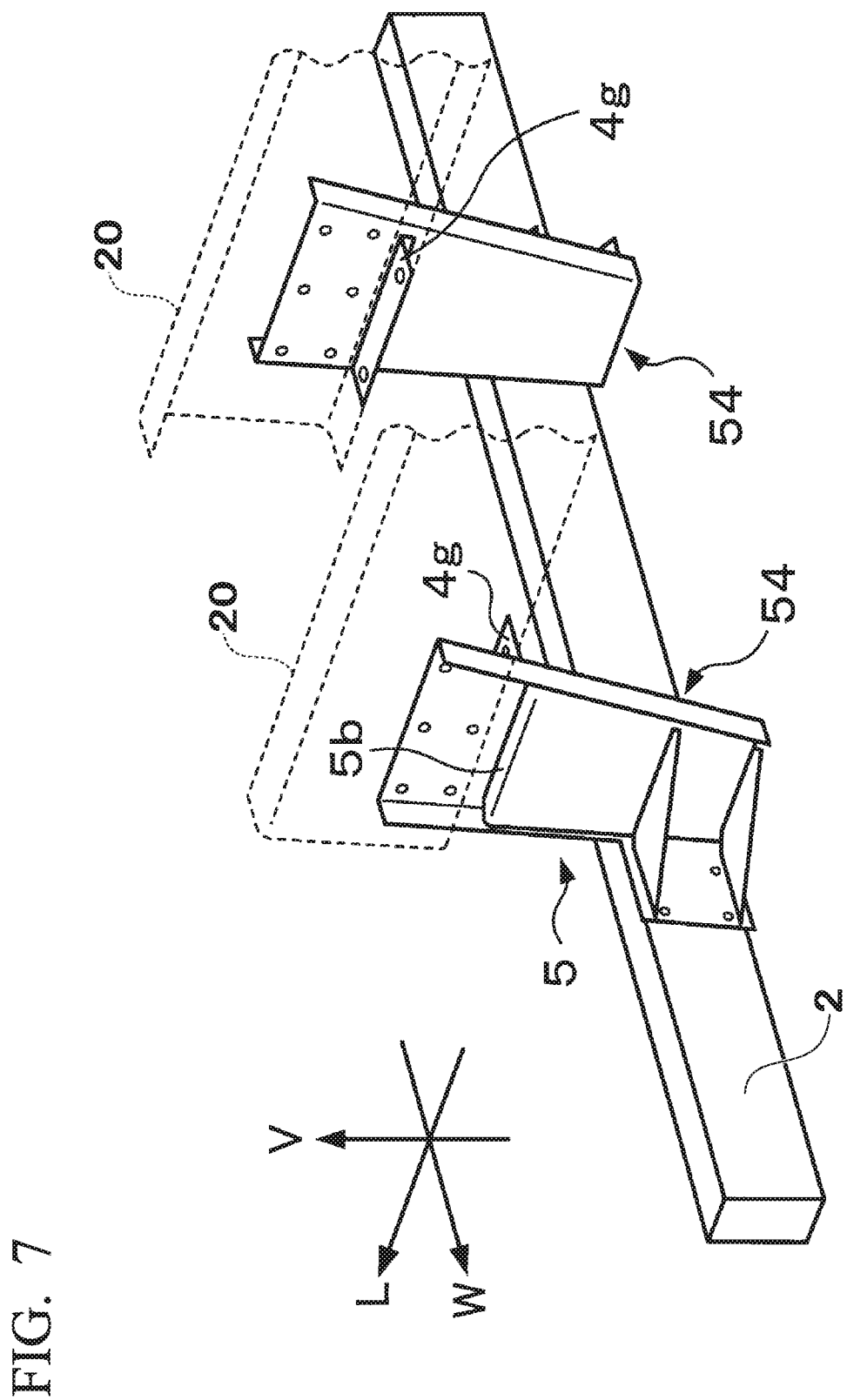
FIG. 7 is a perspective view showing a supporting structure for an underrun protector of Comparative Example 1.

Load bearing performance evaluation tests were simulated using an underrun protector having a supporting structure of a related-art underrun protector, and the supporting structure for the underrun protector having the underrun protector related to the above embodiment. The underrun protector supporting structure of the related-art structure is a structure (Comparative Example 1) where no opening part is formed in a stay body 54 as shown in FIG. 7. The supporting structure for the underrun protector related to the present embodiment is the structure (Example 1) shown in FIG. 1. In each of the supporting structures, a steel sheet with 780 MPa class and 3.6 mm thickness is used as a stay body, a steel sheet with 780 MPa class and 2.9 mm thickness is used as a stay reinforcing body, a steel sheet with 780 MPa class and 3.2 mm thickness is used as a gusset, and a steel sheet with 780 MPa class and 3.2 mm thickness is used as a frame lower face attachment part. Additionally, a height h, in the vehicle width direction, of the closed section formed by the stay body and the stay reinforcing body in Example 1 is 40 mm, a height h1 of the wall face part 4h of the circle part of the opening part is 8.2 mm, W1/W0 obtained by dividing the average width W1 of the opening part of the stay body by the average width W0 of the stay body is 0.65, and L1/L0 obtained by dividing an opening part length L1 of the stay body by the length L0 of the stay body from the flange of the frame lower face is 0.73.

As shown in FIG. 6, the evaluation tests are performed by applying the indenter to a beam side surface part at a position outside the stay attachment position in the vehicle width direction and inputting a load. The input positions of the load are the same in Comparative Example 1 and Example 1. Then, the amounts of indentation (amount of displacement) and the input loads of the indenter were recorded, and the load bearing performances of the underrun protectors of Comparative Example 1 and Example 1 were evaluated.

Figure 8:
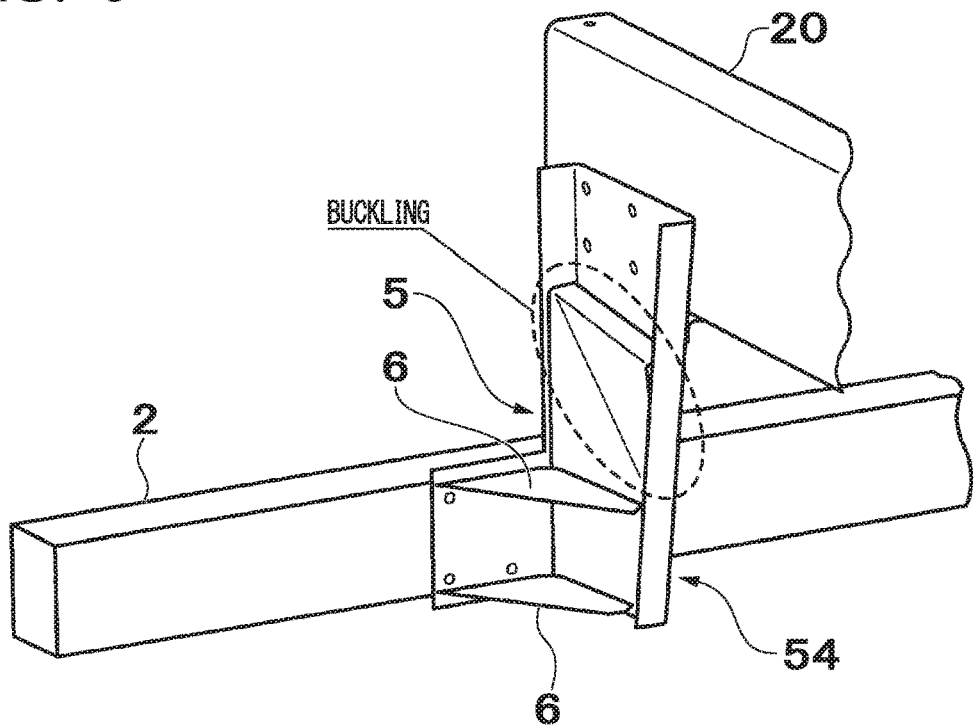
FIG. 8 is a perspective view of a modification example of the underrun protector of Comparative Example 1.
Figure 9:
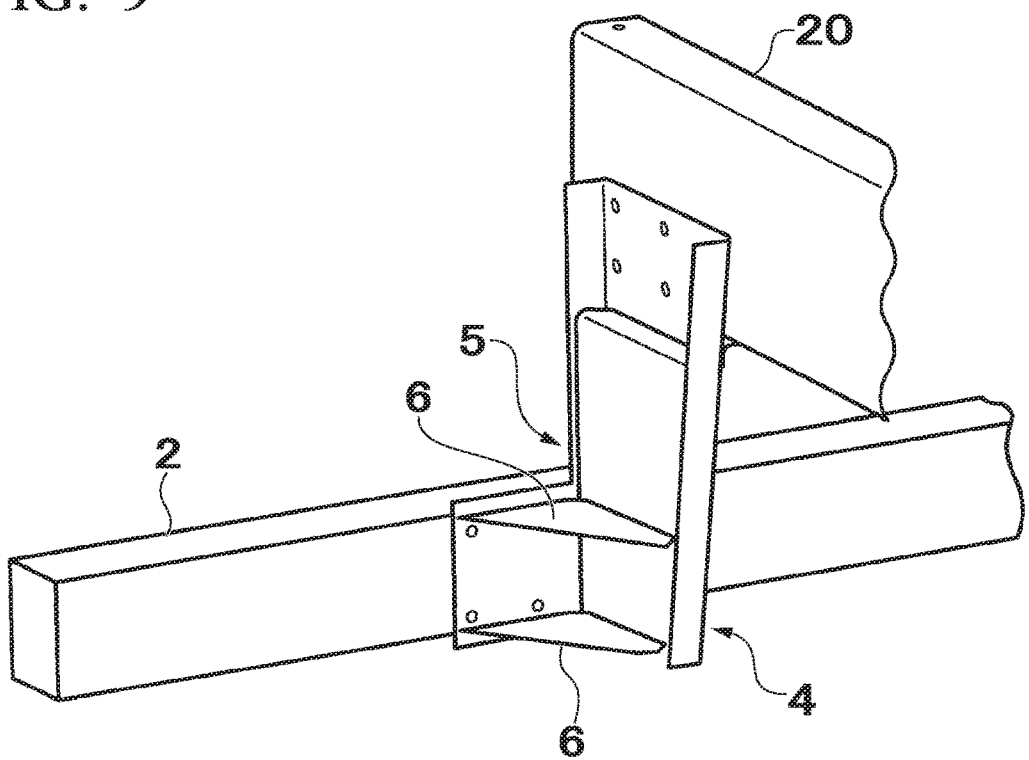
FIG. 9 is a perspective view of a modification example of an underrun protector of Example 1.

Deformations of the underrun protector supporting structures of Comparative Example 1 and Example 1 are compared with each other in FIG. 8 and FIG. 9. Although the out-of-plane deformation (buckling) is observed at a web face part of the stay reinforcing body in FIG. 8, the out-of-plane deformation is not observed in FIG. 9. From this, it was confirmed in the invention that the out-of-plane deformation (buckling) of the web face of the stay reinforcing body is suppressed.

Figure 10:
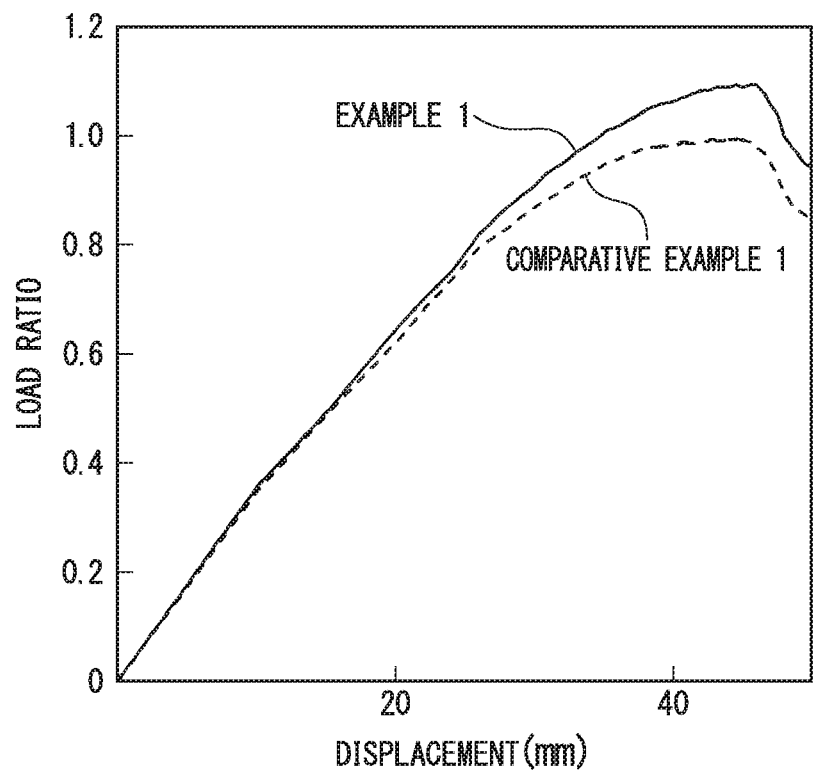
FIG. 10 is a graph in which a relationship between displacements (amounts of indenter indentation) and load ratios when load bearing evaluation test simulation of Comparative Example 1 and Example 1 is carried out.

A relationship of the input loads with respect to the amounts of indenter indentation of Comparative Example 1 and Example 1 is shown in FIG. 10. The load bearing ratios shown in FIG. 10 are values obtained by standardizing recorded loads with the maximum load of Comparative Example 1. From FIG. 10, it was confirmed that the load of Example 1 is improved compared to that of Comparative Example 1.

The maximum load ratio and the weight ratio of the supporting structure for the underrun protector in Example 1 with respect to Comparative Example 1 are shown in Table 1. The load ratio in Table 1 is a value obtained by dividing the maximum load of Example 1 by the maximum load of Comparative Example 1. The weight ratio in Table 1 is a value obtained by dividing the weight of the supporting structure for the underrun protector of Example 1 by the weight of the supporting structure for the underrun protector of Comparative Example 1.

TABLE 1

|  | Load Ratio | Weight Ratio |
| --- | --- | --- |
| Example 1 | 1.10 | 0.94 |

As shown in Table 1, compared to Comparative Example 1, the maximum load of Example 1 is improved by 10%, and the weight is decreased by 5% or more. That is, it is shown that the supporting structure for the underrun protector of Example 1 is improved in load bearing performance and reduced in weight compared to the related-art one.

Next, the same evaluation tests were carried on a structure (Comparative Example 2) in which the frame lower face attachment part 4g and the upper and lower face parts 5b of the stay reinforcing body 5 were removed from the structure of Comparative Example 1 and on a structure (Example 2) in which the frame lower face attachment part 4g and the upper and lower face parts 5b of the stay reinforcing body 5 were removed from the structure of Example 1. The maximum load ratio and the weight ratio of the supporting structure for the underrun protector in Example 2 with respect to Comparative Example 2 are shown in Table 2.

TABLE 2

|  | Load Ratio | Weight Ratio |
| --- | --- | --- |
| Example 2 | 1.10 | 0.94 |

As shown in Table 2, compared to Comparative Example 2, the maximum load of Example 2 is improved by 10%, and the weight is decreased by 5% or more. That is, it is shown that the effect that the supporting structure for the underrun protector of Example 2 can be improved in load bearing performance and reduced in weight compared to the related-art one is not based on the presence or absence of the frame lower face attachment part 4g and the upper and lower face parts 5b of the stay reinforcing body 5.

Figure 11:
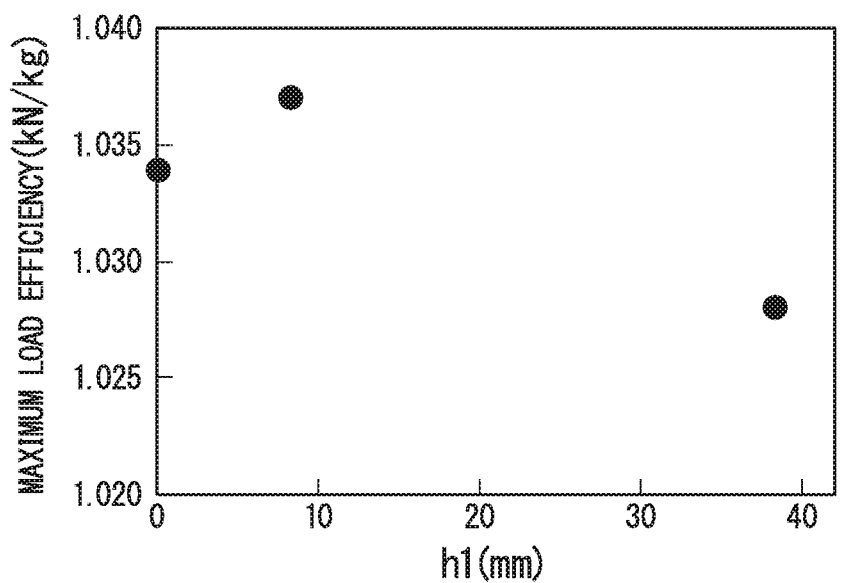
FIG. 11 is a graph showing a relationship between height h1 of a wall face part 4h of a circle part of an opening part, and maximum load efficiency.

Next, in the structure of Example 1, the same evaluation tests were carried out on the structures (Example 3 and Example 4) in which the height h1 of the wall face part 4h of the circle part of the opening part was set to 0 mm and 38.2 mm. A relationship between the height h1 of the wall face part 4h of the circle part and maximum load efficiency is shown in FIG. 11. The maximum load efficiency is a value obtained by dividing the maximum load input to a beam by the total weight of the supporting structure for the underrun protector, and this means that the higher the value, the better the balance between the weight and the load bearing performance.

From FIG. 11, the maximum load efficiency of the 8.2 mm structure is higher than a structure in which the height h1 of the wall face part 4h of the circle part is 0 mm. From this, it is shown that the load bearing performance is increased by coupling wall face parts of the straight side parts to each other by the wall face part of the circle part. On the other hand, the maximum load efficiency of the 8.2 mm structure is higher than a structure in which the height h1 of the wall face part 4h of the circle part is 38.2 mm. From this, even if the wall face part of the circle part is too high, it is shown that an increase in weight becomes larger compared to the effect of improving the maximum load, and an optimal range is shown.

INDUSTRIAL APPLICABILITY

Since the invention is applicable to the supporting structure for the underrun protector to be attached to vehicles, such as an automobile, industrial applicability is high.

BRIEF DESCRIPTION OF THE REFERENCE SYMBOLS

1: UNDERRUN PROTECTOR
2: BEAM
3: UNDERRUN PROTECTOR SUPPORTING STRUCTURE
4: STAY BODY
4a: STAY BODY WEB FACE
4b: STAY BODY FORWARD-REARWARD FACE PART
4c: BEAM ATTACHMENT PART
4d: OPENING PART
4e: WALL FACE PART
4f: FRAME WEB FACE ATTACHMENT PART
4g: FRAME LOWER FACE ATTACHMENT PART
4h: WALL FACE PART OF CIRCLE PART
5: STAY REINFORCING BODY
5a: STAY REINFORCING BODY WEB FACE
5b: STAY REINFORCING BODY UPPER AND LOWER FACE PART
6: GUSSET
20: FRAME
20a: FRAME WEB FACE
20b: FRAME LOWER FACE
L0: VEHICLE UPWARD-DOWNWARD LENGTH OF STAY BODY FROM FRAME LOWER FACE PART
L1: LENGTH OF STAY BODY OPENING PART
W0: AVERAGE WIDTH OF STAY BODY
W1: AVERAGE WIDTH OF STAY BODY OPENING PART
h: HEIGHT OF CLOSED SECTION FORMED BY STAY BODY AND STAY REINFORCING BODY
h1: HEIGHT OF WALL FACE PART EXTENDING FROM CIRCLE PART OF OPENING PART
L: VEHICLE FORWARD-REARWARD DIRECTION
W: VEHICLE WIDTH DIRECTION
V: VEHICLE UPWARD-DOWNWARD DIRECTION

The invention claimed is:

1. A supporting structure for an underrun protector comprising:
a stay body that connects a beam and a frame to each other;
a stay reinforcing body that reinforces the stay body from an outside in a vehicle width direction; and
a gusset provided between the stay reinforcing body and the beam,
wherein a stay body web face of the stay body is provided with an opening part,
wherein a pair of wall face parts provided to extend outward in the vehicle width direction from both ends of the opening part in a vehicle forward-rearward direction are provided so as to face each other, and
wherein each of the wall face parts is provided at a height corresponding to an installation position of the gusset and abuts against an inner surface of the stay reinforcing body in the vehicle width direction.

2. The supporting structure for the underrun protector according to claim 1,
wherein the opening part has a substantially corner-rounded quadrangular shape constituted of a pair of mutually facing straight side parts and a pair of mutually facing circle parts, and each of the wall face parts provided to extend outward in the vehicle width direction from both sides of each of the straight side parts abuts against the inner surface of the stay reinforcing body in the vehicle width direction.

3. The supporting structure for the underrun protector according to claim 1 or 2,
wherein the wall face parts are formed by bending the stay body web face.

4. The supporting structure for the underrun protector according to claim 2 or 3,
wherein a relationship among a length L1 (mm) of the opening part, an average width W1 (mm) of the opening part, a length L0 (mm) of the stay body from a flange of a lower face the frame, an average width W0 (mm) of the stay body, and a height h (mm), in the vehicle width direction, of a closed section formed by the stay body and the stay reinforcing body satisfies $0.5 \leq L1/L0 \leq 0.8$ and $2 \times h \leq W1 \leq 0.85 \times W0$.

5. The supporting structure for the underrun protector according to any one of claims 2 to 4,
wherein a height h1 of the wall face part provided to extend outward in the vehicle width direction from an outer surface of the circle part in the vehicle width direction is 5 mm$\leq 5 \leq h1 \leq 15$ mm.

6. The supporting structure for the underrun protector according to any one of claims 1 to 5,
wherein upper and lower face parts of the stay reinforcing body provided to extend inward in the vehicle width direction from both ends of the stay reinforcing body in a vehicle upward-downward direction are provided, and the upper and lower face parts abut against the stay body.

7. The supporting structure for the underrun protector according to any one of claims 1 to 6,
wherein the frame has a vertically orientated frame web face, and a flange of a lower face of the frame provided to extend outward in the vehicle width direction from a lower end of the frame web face, and
wherein the stay body is fixed by the frame web face and the flange.

8. The supporting structure for the underrun protector according to any one of claims 1 to 7,
wherein the stay body and the stay reinforcing body are made of a steel sheet having a strength of 780 MPa class or more.

* * * * *